United States Patent Office 3,153,444
Patented Oct. 20, 1964

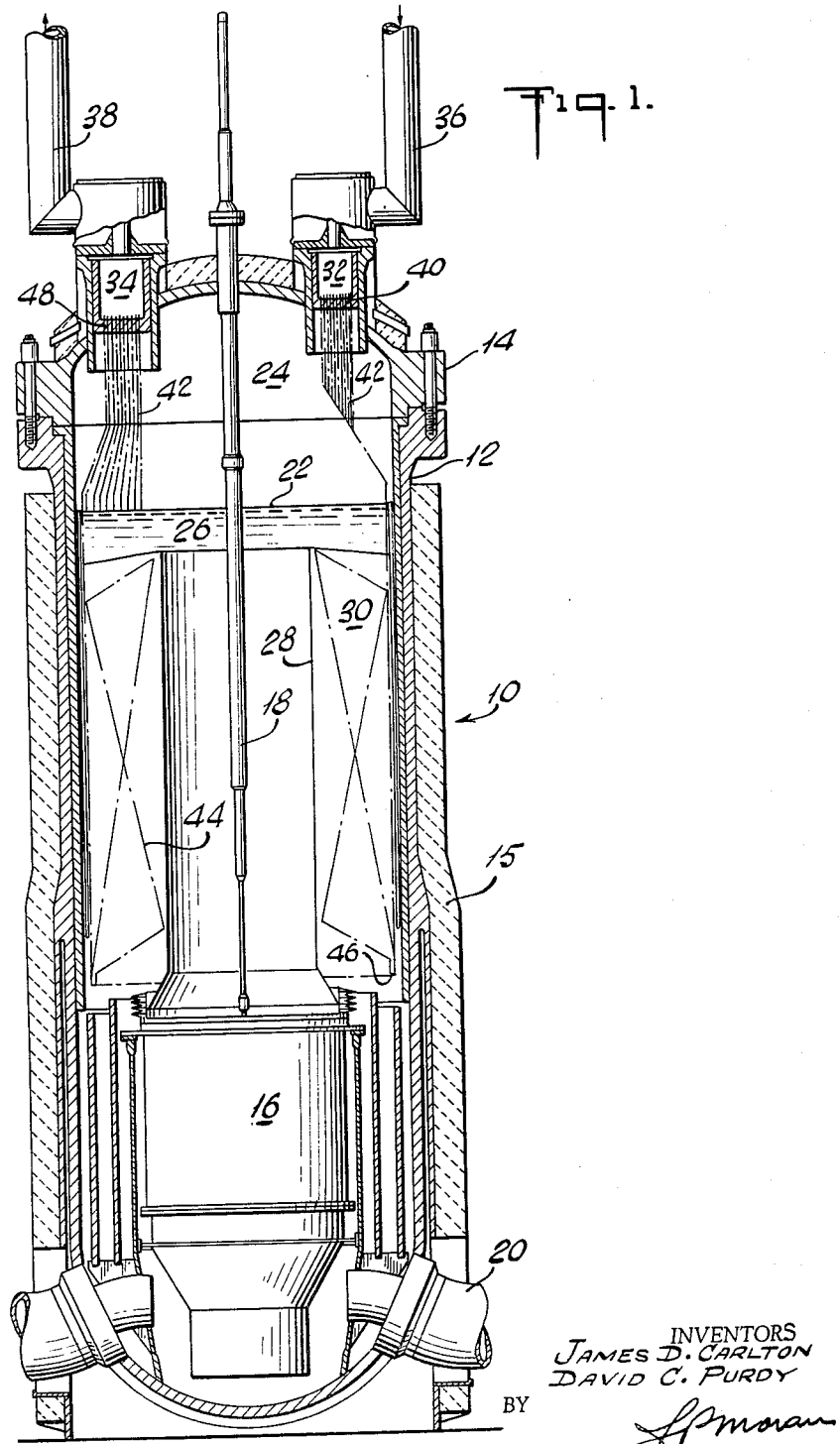

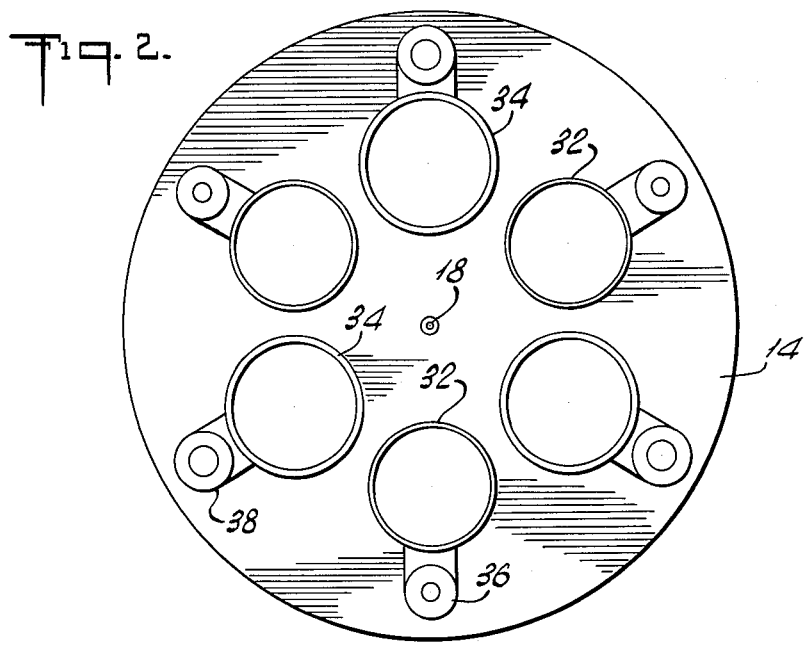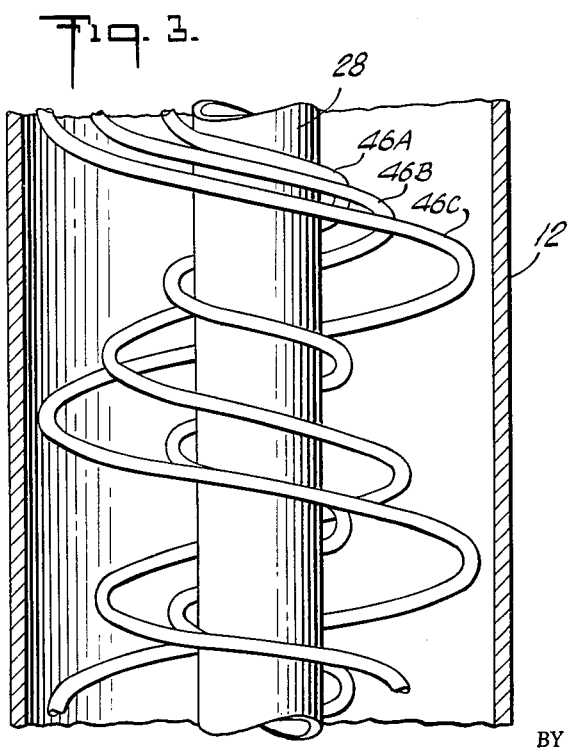

3,153,444
HEAT EXCHANGER
David C. Purdy and James D. Carlton, Lynchburg, Va., assignors, by mesne assignments, to the United States of America as represented by the United States Atomic Energy Commission
Filed Aug. 28, 1962, Ser. No. 219,997
3 Claims. (Cl. 165—74)

This invention relates in general to heat exchangers, and more particularly, to a heat exchanger construction in which the heating fluid is heated and gives up its heat to another fluid within the same vessel.

In a number of present-day heat transfer applications the need for compact heat exchangers has become very important. This is true for nuclear reactor systems and especially so for marine applications where the ability to limit the size of the over-all plant has a number of advantages. If, rather than having separate reactor and heat exchanger units they can be combined within a single vessel, there will be a reduction in the space required for the plant, a savings in the over-all cost of the equipment, the piping requirements will be reduced and the size of the shielding decreased, to mention some of the principal advantages.

It is, therefore, a primary object of this invention to provide a compact and efficient heat exchanger arrangement.

The present invention thus provides a pressure vessel divided by a liquid level into a vapor space above a liquid space. Within the vessel an upwardly positioned cylindrical baffle is located below the liquid level. The baffle is spaced inwardly from and forms in combination with the vessel a vertically extending annular passageway. In the upper end of the vessel there are a number of spaced inlet and outlet chambers. Tubes connected to the inlet chamber extend downwardly within the vessel to the lower end of the passageway where they reverse direction and coil upwardly about the baffle. From the upper end of the baffle, which is below the liquid level, the tubes extend upwardly into the outlet chambers. The heating fluid flows first upwardly through the baffle passing over its top and then downwardly through the passageway in counter-flow heat transfer relationship vaporizing and superheating the fluid to be heated which is flowing within the tubes.

In addition, the tubes are divided into separate groups so that they extend between corresponding inlet and outlet chambers. In this manner, if necessary, one or more groups of tubes can be removed from service while the remainder of them continue in operation.

Further, this invention provides an arrangement whereby a heat source located in the vessel below the tubes imparts heat to the heating fluid before it flows upwardly through the baffle for the eventual transfer of its heat to the fluid to be heated.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Of the drawings:
FIG. 1 is an elevation view, partly in section, of a nuclear reactor embodying the present invention;
FIG. 2 is a top view of the reactor vessel shown in FIG. 1; and
FIG. 3 is a somewhat schematic illustration of a portion of the reactor vessel in FIG. 1 showing the arrangement of the heat exchanger tubes.

In FIG. 1 there is shown a nuclear reactor 10 comprising a pressure vessel 12 closed at its upper end by a bolt connected closure head 14 and encased in insulation 15. Within the lower end of the vessel is a nuclear core 16 within which the fission chain reaction takes place. The fission chain reaction is regulated by means of control rods 18, only one of which is shown, which pass downwardly through the reactor head and extend into the core. The primary coolant, which flows through the core and is also the heating fluid in the heat exchanger of the present invention, enters and leaves the vessel by means of a number of combined inlet and outlet connections 20 located below the core. For a more complete description of the reactor arrangement and its operation reference is made to the copending application of R. M. Dougless, Jr., et al., Serial No. 219,086, filed August 23, 1962, assigned to the United States Atomic Energy Commission.

The interior of the vessel 12 is divided by a liquid level 22 into a vapor space 24 and a liquid space 26, containing the heating fluid. Below the liquid level a vertically arranged cylindrical baffle 28 extends downwardly to a point above the core 16. The baffle 28 is positioned inwardly from and forms in combination with the pressure vessel wall 12 an annular passageway 30.

Disposed in the closure head 14 are a number of inlet chambers 32 and outlet chambers 34 spaced from one another. Inlet pipes 36 and outlet pipes 38 are connected to the inlet and outlet chambers, respectively. The lower wall of the inlet chamber 32 acts as a tube sheet 40 into which are connected a plurality of tubes 42. These tubes 42 extend downwardly from the tube sheet and are directed outwardly so that they extend along the inner wall of the vessel 12 to the lower end of the passageway 30. At the lower end of the passageway the tubes reverse direction being bent first radially inward and then upward. For the extent of their upward path through the passageway 30 the tubes 42 are formed into a helically coiled bundle 44 which substantially fills the passageway.

The tubes within the bundle 44 are arranged so that they are all of substantially equal length within the heat exchanger portion of the vessel. The bundle 44 is made up of a number of helically coiled vertically extending rows 46 with each tube disposed within a single row. As an example, the bundle could contain 20 rows 46, however, for purposes of illustration in FIG. 3 only 3 rows 46A, 46B, 46C are shown. Since each row 46 has a different diameter, each revolution of a tube 42 within row 46B will be greater in length than a tube in the radially inner row 46A and lesser in length as compared with a tube in the radially outer row 46C. It will be noted that the pitch of the helix increases with the diameter of the row as in rows 46A, 46B and 46C. By selectively arranging the number of tubes per row and their pitch it is possible to arrange them so that they will all be of substantially equal length within the passageway 30, and, therefore, the fluid flowing through each tube will receive approximately the same amount of heat. In FIG. 3 this tube arrangement is shown in a rather schematic fashion to indicate the relationship of pitch and diameter between the several helically coiled rows of tubes.

At the upper end of the bundle 44 the tubes 42 are bent upwardly from the helical configuration and extend into the tube sheet 48 of the outlet chamber 34.

It will be noted in FIG. 1 that the cross section of the tube bundle 44 has the shape of a vertically elongated parallelogram. The tube bundle is skewed at an angle of 30° from the horizontal. The main purpose of this skewed arrangement is that in maritime applications with the liquid level changing due to the pitch and roll of the ship, the tube bundle will always remain submerged.

In operation the heating fluid enters the vessel 12 through the combined inlet and outlet connection 20 and flows upwardly through the core 16 absorbing heat generated in the fission chain reaction. From the core the heating fluid continues its upward passage to the top of the baffle 28 and then reverses direction and flows downwardly through the annular passageway 30 flowing over the helically coiled tube bundle 44 and the downcomer tubes 42 which line the outer surface of the passageway. After leaving the passageway the heating fluid flows downwardly and out of the vessel through the connection 20. The manner in which the heating fluid is heated is not an element of the invention set forth herein and may be achieved in a number of ways.

The fluid to be heated is delivered through the inlet pipe 36 into the inlet chamber 32 by means of a pump (not shown). Within the inlet chamber the fluid is distributed into a number of tubes 42 which pass first through the vapor space 24 and then through the liquid space 26 passing downwardly and lining the outer surface of the passageway 30. At the lower end of the passageway the heating fluid reverses direction and flows upwardly through the helically coiled tube bundle 44 in counter-flow relationship with the heating fluid wherein it receives the predominant portion of the heat. After having completed its flow through the bundle 44, the fluid passes through the tubes in the vapor space and enters the outlet chamber 34. From the outlet chamber the fluid to be heated, which has now been vaporized and superheated, passes out through the outlet pipe 38 to a point of use. While the heat exchanger as described is basically a once-through vapor generator, the same general arrangement could be used to provide a saturated steam mixture to the outlet chamber with separated liquid being returned to the inlet chamber for recirculation through the tubes.

Within the heat exchanger practically all of the heat transfer takes place below the liquid level 22, only a negligible amount of heat is imparted to the fluid to be heated as it passes through the tubes in the vapor space 24.

While it is not shown in the drawings, the helically coiled tubes would be dependently supported from the closure head 14.

While the compact arrangement of the heat exchanger with its integral heat source and skewed tube bundle contains particular advantages for marine applications, it will be readily apparent that such an arrangement could also be employed for land based applications as well. Further, as has been previously mentioned, the heat source need not be limited to a nuclear one but any of a number of other types well known in the heat exchanger art may be used.

Another advantage of this heat exchanger resides in the tube bundle support construction which permits the tubes to be removed from the vessel with the closure head. Since the tubes are divided into separate groups connected between corresponding inlet and outlet chambers, flow through one group may be discontinued while the others continue in service. In this way a tube failure will not require that the entire bundle be taken out of service.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A heat exchanger arranged for the passage of a heating fluid in indirect heat transfer relationship with a fluid to be heated comprising
    (A) walls forming a vertically arranged pressure vessel,
    (B) an upwardly extending cylindrically shaped baffle disposed within and spaced from said vessel and forming therewith an annular shaped passageway,
    (C) first wall means arranged in the upper end of said vessel to form a plurality of separate inlet chambers,
    (D) second wall means arranged in the upper end of said vessel to form a plurality of separate outlet chambers spaced from said inlet chambers,
    (E) a multiplicity of tubes within said vessel extending downwardly from said inlet chambers along the outer surface of said passageway to the lower end thereof whereat said tubes are bent radially inward and then upward into a helically coiled bundle disposed about said cylindrical baffle for substantially the height of and substantially filling said passageway,
    (F) said bundle comprising a number of helically coiled concentric rows and each of said tubes is positioned within a single row and the pitch of the tubes in each row is selected in proportion to the diameter of said row whereby each of said tubes is of substantially equal length within said bundle,
    (G) said tubes being divided into separate groups and are connected at their opposite ends into corresponding inlet and outlet chambers,
    (H) and means for supplying the heating fluid to said vessel at the lower end thereof whereby said heating fluid flows upwardly through said baffle and then downwardly through said passageway in heat transfer relationship with the tubes therein, said heating fluid partially filling said vessel to divide the interior thereof into a vapor space and a liquid space, the level of the liquid being above the upper end of said cylindrical baffle.

2. A heat exchanger as set forth in claim 1 wherein a heat source is arranged within said vessel below and in alignment with said baffle.

3. A heat exchanger as set forth in claim 2 wherein said heat source is a nuclear core.

References Cited in the file of this patent

UNITED STATES PATENTS

| | | |
|---|---|---|
| 2,713,994 | Angelery | July 26, 1955 |
| 2,888,251 | Dalin | May 26, 1959 |
| 3,085,626 | Bogner et al. | Apr. 16, 1963 |
| 3,112,735 | Schlichting et al. | Dec. 3, 1963 |

FOREIGN PATENTS

| | | |
|---|---|---|
| 803,382 | Great Britain | Oct. 22, 1958 |